United States Patent
Biondi et al.

(10) Patent No.: US 12,227,324 B2
(45) Date of Patent: Feb. 18, 2025

(54) FEED UNIT FOR ARTICLES

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT)

(73) Assignee: G.D S.P.A., Bologna (IT)

( * ) Notice: Subject to any disclaimer, the term of this patent is extended or adjusted under 35 U.S.C. 154(b) by 22 days.

(21) Appl. No.: 17/998,353

(22) PCT Filed: Jul. 26, 2021

(86) PCT No.: PCT/IB2021/056705
§ 371 (c)(1),
(2) Date: Nov. 9, 2022

(87) PCT Pub. No.: WO2022/023922
PCT Pub. Date: Feb. 3, 2022

(65) Prior Publication Data
US 2023/0227189 A1    Jul. 20, 2023

(30) Foreign Application Priority Data
Jul. 29, 2020 (IT) .................... 102020000018412

(51) Int. Cl.
B65B 29/02  (2006.01)
B65B 5/06   (2006.01)
B65B 35/10  (2006.01)
B65B 61/20  (2006.01)
(Continued)

(52) U.S. Cl.
CPC ............. *B65B 29/022* (2017.08); *B65B 5/06* (2013.01); *B65B 35/10* (2013.01); *B65B 61/20* (2013.01);
(Continued)

(58) Field of Classification Search
CPC ......... B65B 29/022; B65B 5/06; B65B 35/10; B65B 31/20; B65G 15/14; B65G 33/06;
(Continued)

(56) References Cited

U.S. PATENT DOCUMENTS 6,109,426 A    8/2000  Messer, III
6,131,724 A   10/2000  Hirasawatu et al.
(Continued)

FOREIGN PATENT DOCUMENTS

DE    3909373 A1    9/1990
DE   10154203 A1    6/2002
(Continued)

OTHER PUBLICATIONS

DE 101 54 203 A1 (Year: 1984).*
DE 101 54 203 A1 translate (Year: 1984).*
CN717845 (Year: 2022).*
DE10154203 (Year: 2002).*
International Search Report and Written Opinion for PCT/IB2021/056705 filed on Jul. 26, 2021 in the name of G.D S.P.A., mailed on Oct. 18, 2021. 11 pages.

*Primary Examiner* — Gene O Crawford
*Assistant Examiner* — Lester Ill Rushin
(74) *Attorney, Agent, or Firm* — Steinfl + Bruno LLP

(57) ABSTRACT

A feed unit for articles includes: a first feeding device; a second feeding device for individually picking up the articles from the first feeding device at a removal location at a predetermined time interval; and a synchronization device for receiving the articles from the first feeding device and to moving the articles into the removal location. A control system is also provided, to adjust the speed of the synchronization device in such a manner that each article reaches the removal location at the predetermined time interval in order to be picked up by the second feeding device.

14 Claims, 4 Drawing Sheets

Figure 1:
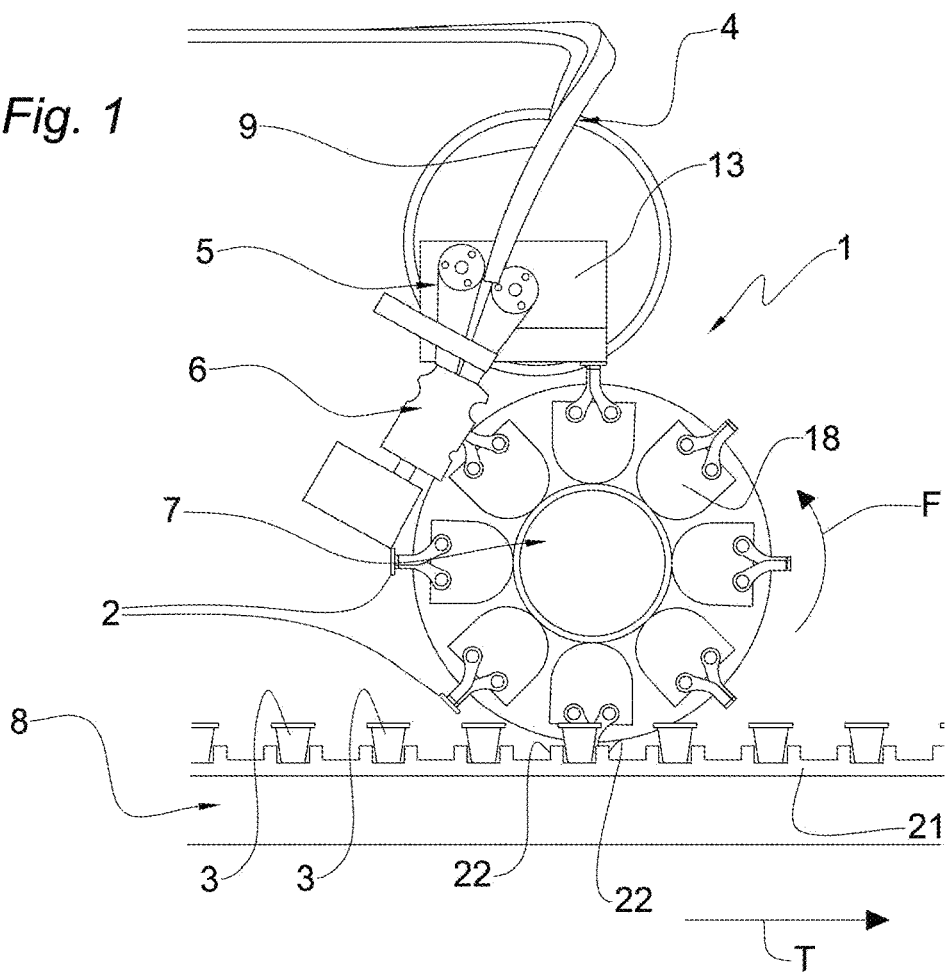

(51) Int. Cl.
*B65G 15/14* (2006.01)
*B65G 33/06* (2006.01)
*B65G 43/08* (2006.01)
*B65G 47/31* (2006.01)

(52) U.S. Cl.
CPC ............. *B65G 15/14* (2013.01); *B65G 33/06* (2013.01); *B65G 43/08* (2013.01); *B65G 47/31* (2013.01); *B65G 2203/0233* (2013.01); *B65G 2811/095* (2013.01)

(58) Field of Classification Search
CPC ............................. B65G 43/08; B65G 47/31; B65G 2203/0233; B65G 2811/095
USPC ....................................................... 198/459.2
See application file for complete search history.

(56) References Cited

U.S. PATENT DOCUMENTS

| | | | | |
|---|---|---|---|---|
| 8,627,944 | B2* | 1/2014 | Kelley | B65D 79/0081 |
| | | | | 198/471.1 |
| 10,112,783 | B2* | 10/2018 | Stauber | B65G 47/61 |
| 2019/0328170 | A1* | 10/2019 | Cai | A47J 31/407 |

FOREIGN PATENT DOCUMENTS

| | | |
|---|---|---|
| EP | 0677462 A1 | 10/1995 |
| EP | 2628683 A1 | 8/2013 |
| WO | 2014/040960 A1 | 3/2014 |
| WO | 2020/109905 A1 | 6/2020 |

* cited by examiner

FEED UNIT FOR ARTICLES

CROSS REFERENCE TO RELATED APPLICATIONS

The present application is the US National Stage of International Patent Application No. PCT/IB2021/056705, filed internationally on Jul. 26, 2021, which, in turn, claims priority to Italian Application No. IT 102020000018412, filed on Jul. 29, 2020.

The present invention relates to a feed unit for articles capable of receiving articles in a disordered manner and delivering them in a controlled manner. It is also directed to a method for feeding articles in a controlled manner.

The present invention finds a preferred, though not exclusive, application in the field for preparing and packaging food and non-food products, an example of which is represented by the capsules for infusion type beverages, e.g. coffee, a product to which reference will be made below without loss of generality.

In particular, in this technical field, production and packaging apparatuses are known in which a plurality of containers are individually filled with the product to be packaged, e.g. coffee powder, and then, after being closed by an appropriate membrane, are packaged in special boxes and sent to the final packaging step.

Along this production and packaging apparatus there are provided several operations wherein articles of different types must be fed in a controlled manner to a workstation or a conveyor enslaved thereto.

Such articles could be, for example, protection discs to be inserted in the still empty containers between the bottom of the container and a filter that encloses the product to be packaged (e.g. coffee powder) to prevent the filter from being accidentally punctured during the step of preparing the beverage.

Or, at another location of the production and packaging apparatus, these articles are represented by the finished containers to be fed to a packaging station where they are boxed.

In this description as well as in the accompanying claims, certain terms and expressions are deemed to have, unless otherwise expressly indicated, the meaning expressed in the following definitions.

The term "article" means any object apt to be moved along a guide.

The articles can be identical to each other, or they can differ from each other in some characteristics such as the shape, the composition or the colour.

The articles are arranged in the guide "one after the other" when they are positioned in a row without any substantial interruption. In other words, the articles are generally in a row one next to each other, in contact with each other, without excluding the possibility of a slight and temporary distancing between the articles during the movement thereof along the guide.

A "guide" is a mechanical member which is provided to allow the sliding of the articles inside it between a departure section and an arrival section along a substantially linear path, which in turn can be rectilinear or curved. The sliding of the articles within the guide can take place by means of gravitational force or be favoured by the provision of a transporter member, such as a strap or a belt, or by jets of air.

Preferably, the guide extends along a prevalent longitudinal direction, which allows defining a longitudinal axis of the guide and defines the linear path of the articles between the departure and arrival sections.

Preferably, the guide is provided to keep the articles in a predetermined spatial orientation while sliding along the linear path.

One or more articles are fed or delivered or otherwise moved "in a controlled manner" when it is possible to move said one or more articles to a predetermined position at a predetermined instant.

Analogously, one or more articles are fed or delivered or otherwise moved "in an uncontrolled manner" when it is not possible to ensure that said one or more articles are in a predetermined position at a predetermined instant.

To this end, it should be noted that an "instant" is generally defined by a sufficiently narrow time interval, depending on the needs of the production process.

Examples of uncontrolled feeding are represented by sliding, by means of gravitational force, of articles along inclined guides, slides, or by transport on conveyors without suitable seats for the articles, which can therefore move relative to the conveyor during movement.

Another example of uncontrolled feeding is when the articles are supplied to a conveyor in a random manner, both in terms of frequency and in terms of positioning on the conveyor.

An article is retained "in an integral manner" with a device or a part thereof when the article cannot move relative to said device or said part thereof.

The Applicant has preliminarily noted that in certain feeding operations it is required that the articles are delivered in a controlled manner.

The Applicant has also ascertained that the feeding of articles can be adequately controlled by using specific feeding devices which move the articles individually or in groups from a departure location to an arrival location while these articles are in a defined position with respect to the feeding device.

In particular, the Applicant has noted that in such feed units, the movement of each article between the departure location and the arrival location is uniquely determined by a corresponding movement of the feeding device, so that by monitoring the movement of the feeding device, the position and speed of each article can also be identified.

The Applicant has noted, however, that such feeding devices require the articles to be supplied to them in a very precise manner. In particular, the Applicant has verified that the article to be picked up from the feeding device must be present at a determined removal location at a given instant.

The Applicant has, however, found that this requirement is often ill-adapted to the fact that the articles are conveyed to the removal location in a substantially disordered manner, typically piled up one next to each other, and has ascertained that the possibility of a failed meeting at the removal location between article and feeding device can lead to serious undesirable consequences, such as a processing cycle being skipped or, in some cases, damage to the article or even the blockage of the feeding process.

Moreover, the Applicant has verified that the possibility of this undesirable occurrence increases in the event that the speed at which the articles are fed is particularly high, due to the reduction in the cycle times and, consequently, to the reduction in the time at which the article must be removed from the feeding device.

The Applicant has therefore perceived that this drawback can be overcome by providing for the passage from the uncontrolled movement of the articles to the controlled movement of the same to be adequately adjusted.

Finally, the Applicant has found that by interposing a synchronization device with adjustable speed between a first feeding device, in which the movement of the articles is not controlled, and a second feeding device, in which the movement of the articles is controlled, it is possible to absorb the unevenness of movement of the articles that are inevitably correlated to the movement of the first feeding device in order to be able to adapt it to the requirements of precision in terms of time and of position of the second feeding device.

Thus, in a first aspect thereof, the present invention is directed to a feed unit for articles comprising a first feeding device.

Preferably, said feed unit comprises a second feeding device.

Preferably, said second feeding device is provided to individually pick up said articles from said first feeding device.

Preferably, said articles are picked up from said second feeding device at a predetermined removal location and at a predetermined time interval.

Preferably, said feed unit comprises a synchronization device, which is provided to receive said articles from said first feeding device and to move them into said removal location at an adjustable speed.

Preferably, said feed unit comprises a speed control system which is provided to adjust the speed of said synchronization device in such a manner that each article reaches said removal location at said time interval in order to be picked up by said second feeding device.

In a second aspect thereof, the present invention is directed to a method for feeding articles in a controlled manner.

Preferably, the method comprises the step of moving said articles along a first feeding device.

Preferably, the method comprises the step of receiving said articles from said first feeding device by means of a synchronization device.

Preferably, said synchronization device retains said articles together in an integral manner.

Preferably, the method comprises the step of moving said articles by means of said synchronization device towards a removal location.

Preferably, the method comprises the step of individually picking up said articles, by means of a second feeding device, at said removal location and at a predefined time interval.

Preferably, the method comprises the step of adjusting the speed of said synchronization device in such a manner that each article reaches said removal location at said time interval in order to be picked up by said second feeding device.

Thanks to these features, each article coming in an uncontrolled manner from the first feeding device is taken over by the synchronization device and, depending on the moment and the position in which it is taken over by the synchronization device, it is moved towards the removal location at the appropriate speed in order to arrive promptly at the meeting with the second feeding device at the removal location.

In a third aspect thereof, the present invention is directed to an apparatus for producing capsules for infusion type beverages, comprising a conveyor for empty capsules and a feed unit of protection discs to be deposited in said empty capsules, wherein said feed unit is made according to the aforesaid first aspect.

In a fourth aspect thereof, the present invention is directed to an apparatus for packaging capsules for infusion type beverages, comprising a conveyor for empty box-shaped packagings and a feed unit for capsules for infusion type beverages to be deposited in said empty box-shaped packagings, wherein said feed unit is made according to the aforesaid first aspect.

In at least one of the aforesaid aspects, the present invention may also have at least one of the preferred features set out below.

Preferably, in said first feeding device said articles are moved in a row one after the other.

In this way, it is easier for the synchronization device to take over the single articles.

Preferably, said predetermined time interval is defined within a processing cycle time.

In some embodiments, said first feeding device comprises a guide inside which said articles are moved towards said synchronization device by sliding.

Preferably, said articles slide in said guide by gravitational force or are driven by means of jets of air.

In other embodiments, this first feeding device comprises a conveyor belt or roller conveyor.

In this way, the part of uncontrolled movement of the articles can be carried out in a simple and economical way.

In some embodiments, said second feeding device comprises at least one screw which is provided to pick up one article at a time from said removal location and to move it at a predefined and controlled speed towards a release location. Preferably, said second feeding device comprises a pair of counter-rotating screws.

In this way, the article can be moved in a controlled manner thanks to the engagement with the groove of the screw.

In other embodiments, said second feeding device comprises gripping elements for each article, for example of the pincer or suction cup type.

Preferably, said second feeding device transports said articles up to a release location.

Preferably, said second feeding device is synchronized with a conveyor, on which it deposits said articles at said release location.

In this way, articles can be fed in a controlled manner to a workstation of said articles.

Preferably, said second feeding device is synchronized with an exchange wheel which is provided to receive said articles that are delivered by said second feeding device at said release location and to deposit them on a conveyor.

In this way, it is possible to feed articles in a controlled manner to a workstation even with the articles oriented differently from the way in which they are released by the second feeding device.

Preferably, said articles are deposited on said conveyor in predefined positions.

Preferably, said second feeding device is synchronized with said conveyor or said exchange wheel in a mechanical manner.

In some embodiments, said synchronization device comprises a pair of counter-rotating conveyor belts which face each other.

Preferably, said articles are retained individually between said pair of conveyor belts when they are moved towards said removal location.

In this way it is possible to take over individually each article coming from the first feeding device regardless of the instant in which they arrive at the entrance of the pair of conveyors.

In a preferred embodiment, said control system adjusts the rotation speed of said pair of counter-rotating conveyor belts.

In this way it is possible to ensure that even the articles taken over by the synchronization device with a slight delay or a slight advance can be brought to the removal location at the correct time in order to be removed by the second feeding device.

Preferably, said control system comprises a position sensor which is provided to detect the position of an article during the movement thereof on said synchronization device upstream of said removal location, so that said control system can adjust the speed of said synchronization device.

In this way, the control system can immediately and easily detect any slight delay or anticipation of the article with respect to the removal location and allow the speed of the synchronization device to be adjusted accordingly.

In a preferred embodiment, said articles are fed at a speed greater than 500, more preferably greater than 1000 articles per minute, even more preferably greater than 1200 articles per minute.

In a preferred embodiment, said articles are capsules for infusion type beverages, e.g. coffee.

In another embodiment, said articles are protection discs to be inserted in capsules for infusion type beverages, e.g. coffee.

Figure 2:
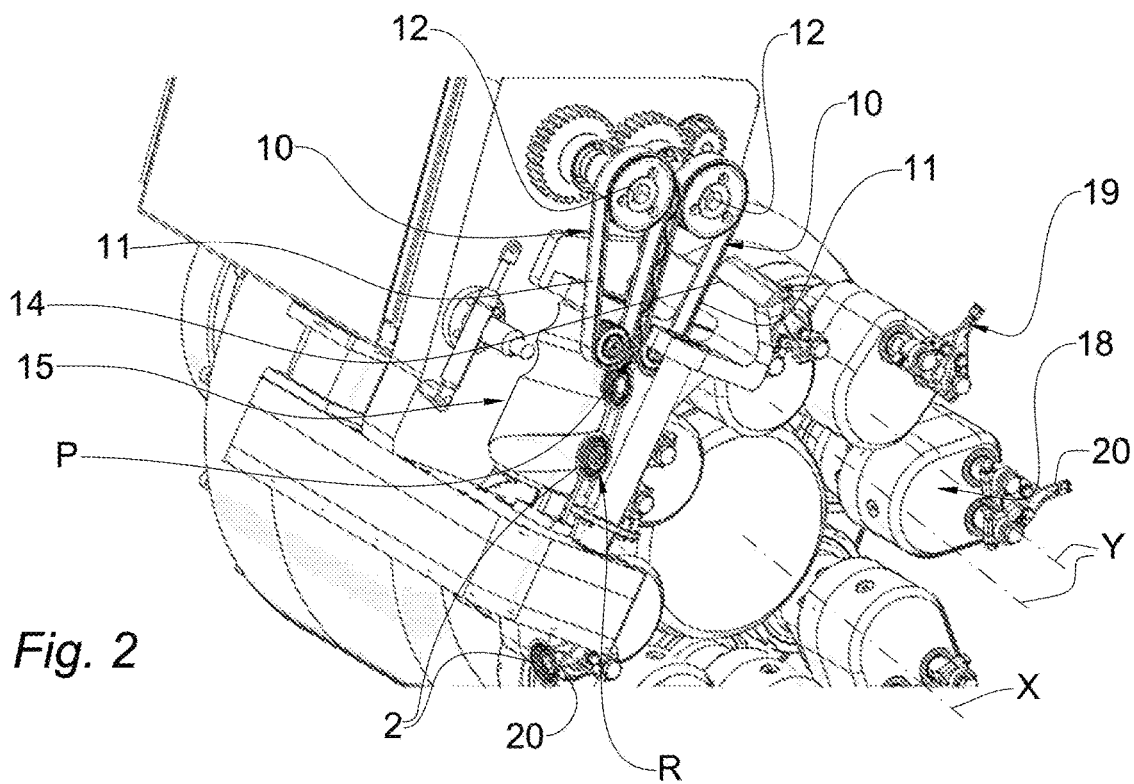
Figure 3:
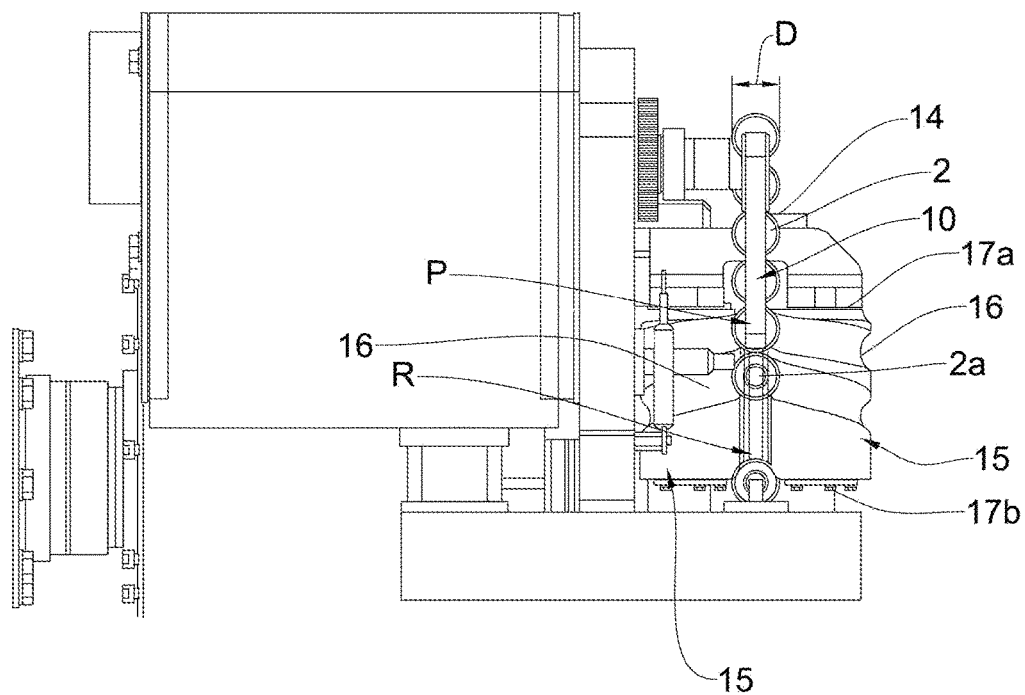
Figure 4:
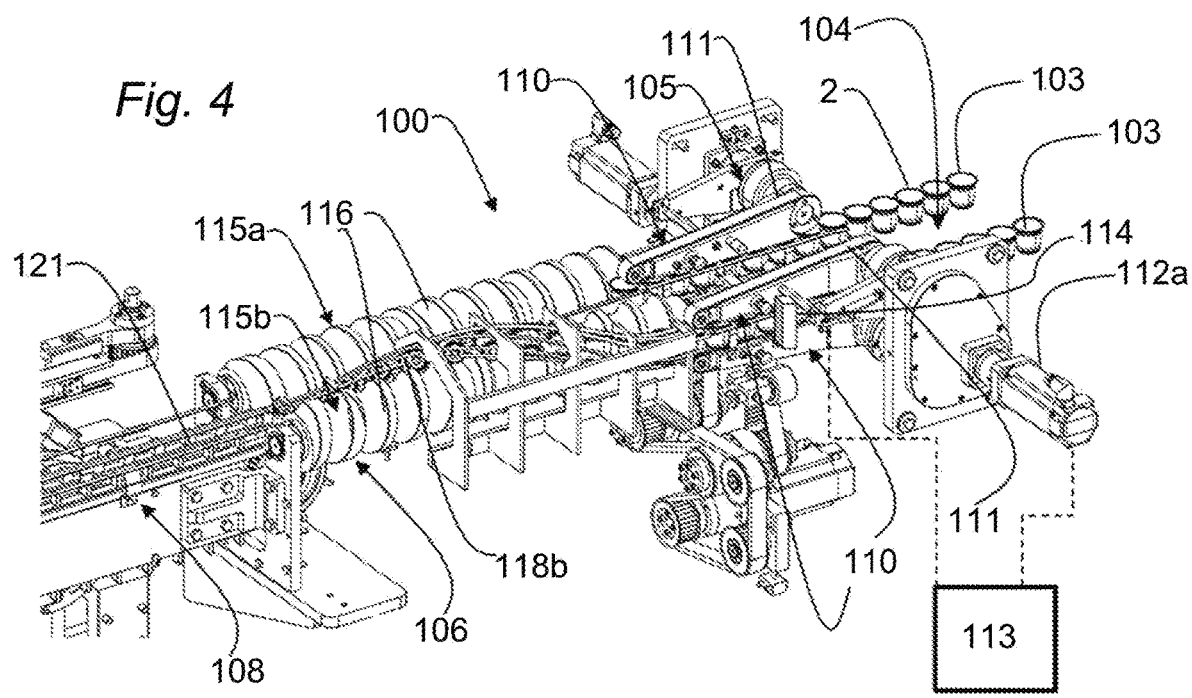
Figure 5:
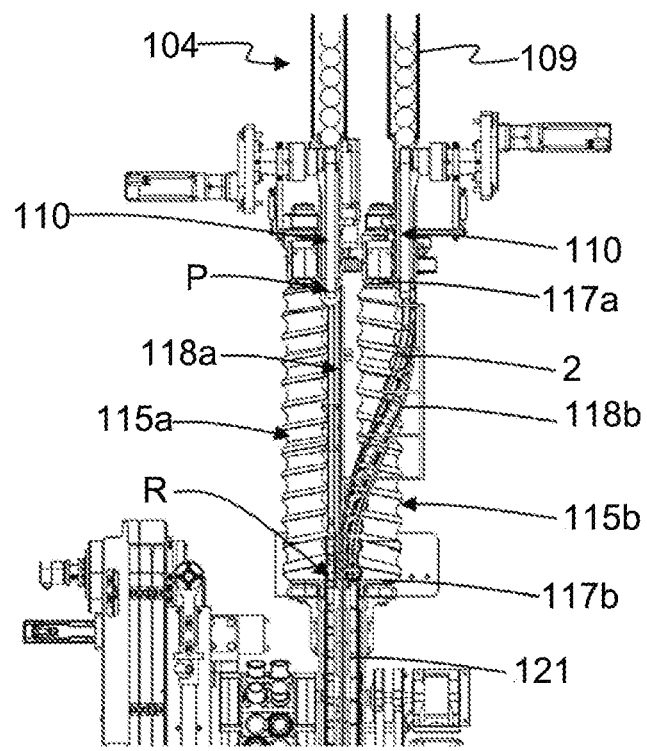
Figure 6:
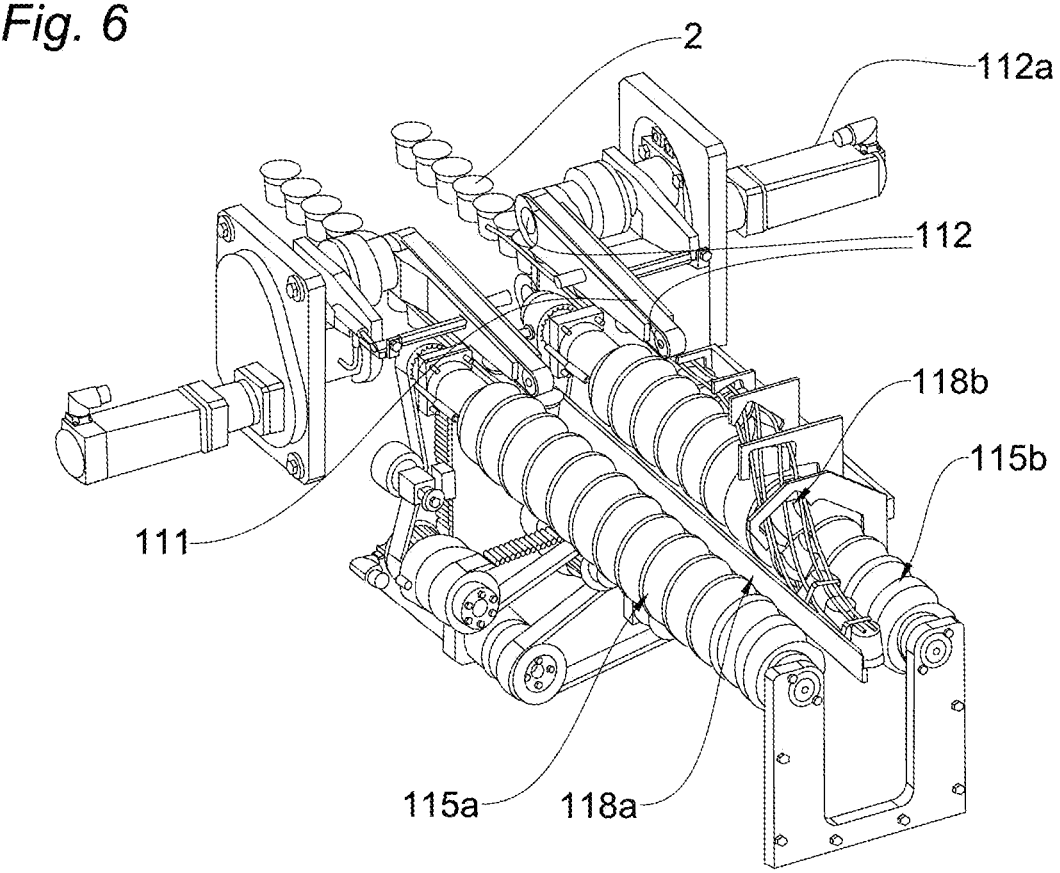
Figure 7:
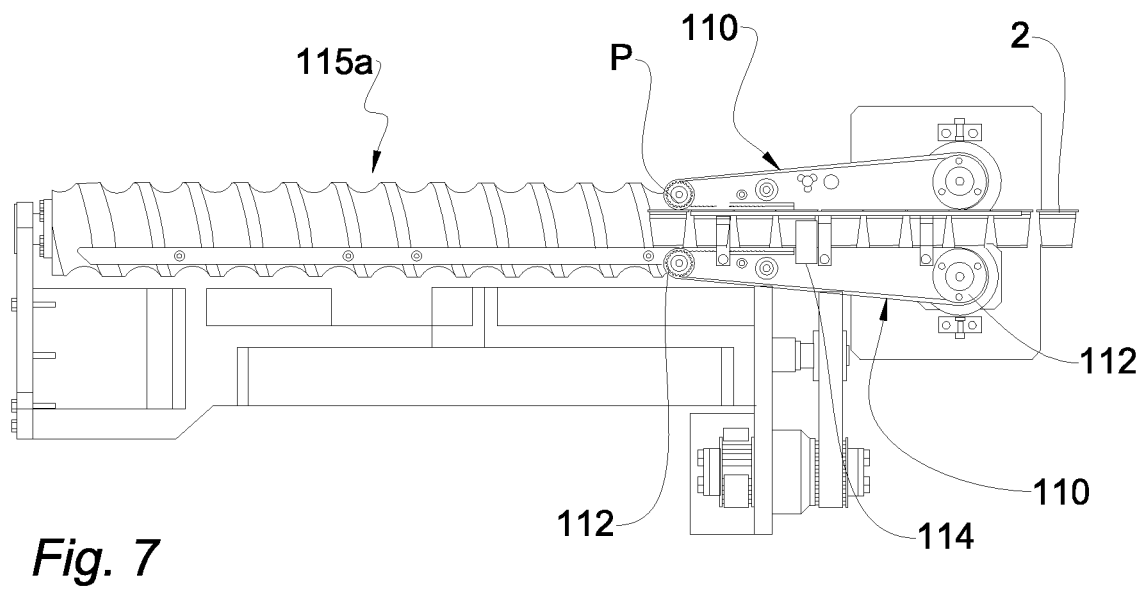

The characteristics and advantages of the invention will become clearer from the detailed description of an embodiment illustrated, by way of non-limiting example, with reference to the appended drawings wherein:

FIG. 1 is a schematic front view of a first example of an embodiment example of a feed unit for articles made in accordance with the present invention;

FIG. 2 is a schematic front view from a different angle of the feed unit of FIG. 1 without a component, FIG. 3 is a schematic view in side perspective of the feed unit in FIG. 1, FIG. 4 is a schematic view in side perspective of a second example of an embodiment example of a feed unit for articles made in accordance with the present invention, FIG. 5 is a schematic plan view from above of the feed unit in FIG. 4, FIG. 6 is a schematic front view of the feed unit in FIG. 4, FIG. 7 is a schematic side elevation and sectional view of the feed unit in FIG. 4.

With initial reference to the accompanying FIGS. 1 to 3, 1 indicates overall a feed unit for articles 2 constructed in accordance with the present invention.

In the first embodiment example described herein, the feed unit 1 is inserted within an apparatus for preparing and packaging capsules for infusion type beverages, in particular coffee, and is provided to feed a plurality of protection discs at the bottom of respective capsules 3, empty, prior to the filling thereof with coffee powder.

The articles 2 are then formed by the protection discs.

The latter have a slab shape, with a large central hole and a plurality of small holes 2a and a plurality of small holes uniformly distributed throughout the rest of the surface. The protection discs are identical between them and have a circular shape with a diameter D of about 30 to 40 mm and a thickness of about 1 to 3 mm, which is substantially constant.

The discs also have a slightly convex shape, so that the total thickness of the articles 2 defines a footprint of about 3 to 6 mm.

Therefore, in the articles 2 two prevalent dimensions, measuring equal to the diameter D, and a third dimension with a significantly lower measurement corresponding to the total thickness of the article remain identified.

The feed unit 1, in the most general components thereof, comprises a first feeding device 4 of the articles 2, a synchronization device 5, which is provided to receive the articles 2 from the first feeding device 4 and to move them into a removal location P, a second feeding device 6, which is provided to individually pick up the articles 2 at the removal location P, as well as an exchange wheel 7 which is provided to receive the articles 2 from the second feeding device 6 at a release location R and to deposit them on a conveyor 8.

The first feeding device 4 comprises a guide 9 in which the articles 2 are arranged in a row one after the other to be moved towards the synchronization device 5.

The guide 9 is extended along one of its longitudinal axes and is delimited by retention walls defining a chamber with a substantially rectangular section inside which the articles 2 are accommodated with an ability to slide freely. In particular, the articles 2 can slide inside the guide 9 by means of gravitational force or thanks to suitable jets of air that are delivered by a plurality of nozzles specifically positioned along the guide 9 and connected to a pneumatic system (not shown).

The synchronization device 5, which is located immediately downstream of the first feeding device 4, comprises a pair of counter-rotating conveyor belts 10 which face each other, between which the articles 2 coming from the guide 9 are retained one by one and moved towards the removal location P.

Each conveyor belt 10 comprises a belt 11 wound around a pair of pulleys 12, at least one of which is controlled to be rotated by a motor with adjustable speed.

Consequently, the advance speed of the conveyor belts 10 is adjustable and the feed unit 1 advantageously comprises a control system 13, which is provided to adjust the speed of the synchronization device 5.

In particular, the speed of the conveyor belts 10 is adjusted in such a manner that each article 2 reaches the removal location P at a predetermined time interval within a defined cycle time of the feed unit 1.

For this purpose, the control system 13 also comprises a position sensor 14 which is provided to detect the position of each article 2 as it is moved between the conveyor belts 10 towards the removal location P.

In this way, the control system 13 detects the position of the article 2 and is able to calculate the correct speed for it to arrive at the removal location P at the predetermined time and adjust the advance speed of the conveyor belts 10 accordingly, acting on the respective motors.

This advantageously allows each article 2 to be picked up at the removal location P by the second feeding device 6, which comprises a pair of counter-rotating screws 15.

The screws 15 are substantially identical between them and are driven in rotation in opposite directions to each other along mutually spaced and parallel rotation axes (in FIG. 2 one of the two screws has been removed for the sake of clarity).

On each screw 15, a respective groove 16 extended in a spiral with increasing spacing is formed between a first end 17a of the screw, close to the synchronization device 5 and at which the removal location P is defined, and a second end 17b of the screw, close to the exchange wheel 7 and at which the release location R is defined.

The exchange wheel 7 is driven in rotation about a horizontal axis X in a direction of rotation indicated in the figures by the arrow F.

Eight gripping heads 18, each provided with a gripping element 19 of the pincer type, are mounted on the exchange wheel 7 with an ability of limited movement.

Each gripping head 18 may pivot with respect to the exchange wheel 7 about a respective pivot axis Y, which is parallel to the rotation axis X of the exchange wheel 7, while each gripping element 19 comprises a pair of rods 20 that are hinged relative to each other in a median position and are movable between a closed configuration in which the rods 20 are approached to each other so as to be able to enter the hole 2a of an article 2 and an open configuration in which the rods 20 are approached to each other so as to abut the article the wall of the hole 2a and engage the article 2 with retention (FIG. 2).

Both the oscillation of the gripping heads 18 and the opening and closing of the gripping elements 19 are controlled by a cam type rotation mechanism, which is mounted on the exchange wheel 7.

The conveyor 8 on which the empty capsules 3 are transported comprises a conveyor belt 21 driven in advancement along a substantially horizontal direction T.

On the conveyor belt 21 there are provided support elements 22, suitably spaced, between which the empty capsules 3 are positioned. The conveyor belt 21 is suitably positioned to pass under the exchange wheel 7 so that each article 2 can be deposited by the gripping element 19 within a respective empty capsule 3.

To ensure the correct positioning of the articles 2 in the empty capsules 3, the conveyor 8, the exchange wheel 7 and the second feeding device 6 are synchronized with each other, preferably by means of appropriate mechanical transmission of the motion.

The feed unit 1 operates as described below.

The articles 2, are conducted inside the guide 9 one after the other up to the pair of conveyor belts 10. The movement along the guide is by means of gravitational force and the action of the jets of air so that the articles 2 reach the conveyor belts 10 in an uncontrolled manner.

The conveyor belts 10, in the rotational motion thereof, engage one article 2 at a time and, by retaining it in an integral manner between them, move it towards the removal location P.

When the article 2 on its way towards the removal location arrives at a certain position it is detected by the position sensor 14 which transmits the signal to the control system 13. The latter, depending on the spacing from the removal location P and the time at which the detection of article 2 took place, calculates the speed required to reach the removal location P in the predefined time period for the meeting with the second feeding device 6, compares the calculated speed with the current speed of the conveyor belts 10 and, if necessary, corrects the current speed accordingly by setting it to the calculated speed.

In this way, each article 2 reaches the removal location P at the instant in which it can be properly engaged between the grooves 16 of the counter-rotating screws 15 and be moved towards the release location R.

In fact, it can be noted that if the article arrives at removal location P before or after this time interval, it might get between a pair of ridges of the screw and not between the two grooves 16, with consequent possibility of deformation or breakage or blockage of the feed unit.

Each article 2 is moved towards the release location R in a controlled manner as the position thereof and the speed thereof at each instant is uniquely defined by the movement of the screws 15.

Thanks to the increasing spacing of the grooves 16, the article 2 during this movement is appropriately spaced from the article following it, to facilitate the delivery thereof to the exchange wheel 7.

The latter, in its rotational motion, brings a gripping head 18 close to the article 2 and, at the release location R, the gripping element 19, in closed configuration, enters exactly into the hole 2a. At this point, the gripping element 19 moves into an open configuration engaging the article 2, which in the meantime is disengaged from the screws 15, and retaining it until the gripping head 18 is brought by the rotation motion of the exchange wheel 7 above the conveyor 8 and, precisely, on the vertical of an empty capsule 3 inside which the article 2 is deposited.

The speed of the conveyor belt 21 and the exchange wheel 7 is such that the articles 2 are deposited in the empty capsules 3 at substantially zero relative speed, so as to allow the deposition operation to be carried out continuously.

FIGS. 4 to 7 show a feed unit overall indicated by 100 representing a second embodiment of the present invention.

Details of the feed unit 100 similar to those of the feed unit 1 described in the previous example are given with the same numerical references.

In this second embodiment, the feed unit 100 is inserted within an apparatus for packaging capsules for infusion type beverages, for example coffee, comprising a conveyor for empty box-shaped packagings (not shown) and a feed unit for coffee capsules to be deposited in the empty box-shaped packagings.

In this case, therefore, the articles 2 are formed by finished coffee capsules that are ready to be boxed.

Each capsule is formed by a substantially rigid casing, shaped like a glass, which has a truncated conical shape in which a bottom, at the smaller base thereof, and an extended lateral wall with a slight flaring towards a head opposite to the bottom, at a larger base thereof, are defined. At the head, the casing has a mouth which is closed by a lid such as, for example, an aluminium sheet which can be removed and fixed to the edges of the mouth.

The feed unit 100 is substantially similar to the feed unit 1, and it also comprises a first feeding device 104 for the articles 2, a synchronization device 105, which is provided to receive the articles 2 from the first feeding device 104 and to move them into a removal location P, a second feeding device 106, which is provided to individually pick up the articles 2 at the removal location P.

Unlike the feed unit 1, however, the second feeding device 106 of the feed unit 100 deposits the articles 2 at a release location R directly onto a conveyor 108 which takes care of bringing the articles 2 to a transfer station where the articles 2 are picked up in groups and deposited in the empty boxes.

The first device 104 comprises a conveyor belt 109 (schematised in FIG. 5) on which the articles 2 are brought in an uncontrolled manner towards the synchronization device 105 in two separate rows 103, in each of which the articles 2 are arranged one after the other in an upright position, i.e. resting on the bottom and with the head facing upwards.

The synchronization device 105 comprises, for each row of articles 103, a pair of counter-rotating and mutually facing conveyor belts 110, entirely similar to the conveyor belts 10 of the previous example.

The conveyor belts 110 of each pair are also provided to retain the articles 2 individually and to move them towards the removal location P and comprise a belt 111 wound around a pair of pulleys 112, at least one of which is controlled to be rotated by a motor 112a with adjustable speed, which in turn is controlled by a control system 113.

As in the previous example, the control system 113 is provided to adjust the advance speed of the conveyor belts 110 based on a signal from a position sensor 114 apt to detect the position of each article 2 along the path thereof between the conveyor belts 110. In this way, each article 2 can reach the removal location P at a predetermined time interval within a defined cycle time of the feed unit 100.

The second feeding device 106 comprises, for each row 110, a respective screw 115a and 115b, which extends along a substantially horizontal direction, parallel to the respective row 103, between a first end 117a, close to the respective pair of conveyor belts 110 and at which the removal location P is defined, and a second end 117b, close to the conveyor 108 and at which the release location R is defined.

On each screw 115a, 115b, a groove 116 is formed which extends in a spiral with increasing spacing between the first end 117a and the second end 117b, and having a width similar to the width of each article 2.

A guide 118a, which is substantially rectilinear, is flanked by the screw 115a so that the articles 2 engaged by the respective groove 116 are moved in a controlled manner towards the release location R while maintaining the same upright orientation, resting on the bottom.

On the contrary, a curvilinear guide 118b is extended around the screw 115b, through a total angle of about 180°, so that the articles 2 which are engaged by the respective groove 116, while being moved in a controlled manner towards the release location R, are simultaneously upturned so that at the release location they are in an upturned position, i.e. resting on the head and with the bottom facing upwards.

The conveyor 108 comprises a conveyor belt 121 driven in continuous advancement towards the transfer station where the articles 2 are picked up and deposited in the empty boxes. On the conveyor belt 121, two rows of seats are formed which are apt to receive the articles 2 coming from the screws 115a and 115b, respectively.

The operation of the feed unit 100 is substantially similar to that of the feed unit 1 described above.

In particular, the articles 2 are brought in an uncontrolled manner from the first feeding device 104 in two rows 103 towards the respective synchronization device 105, where the articles 2 are engaged one by one by the pair of conveyor belts 110 which, by retaining them at the head and the bottom, move them towards the removal location P.

Depending on the position of the article 2 detected by the position sensor 114 along the path towards the removal location, the advance speed of the conveyor belts 110 is adjusted by the control system 113, so that the article 2 reaches the removal location P when the groove 116 of the respective screw 115a or 115b is in the correct position to be able to engage it without damaging it.

At this point, the article 2 is moved by the screw 115a or 115b in a controlled manner and with the aid of the guide 118a or 118b towards the release location R where the article is deposited on the conveyor belt 121.

Thanks to the features of the present invention, it is therefore possible to move the articles in a controlled manner from an uncontrolled movement configuration avoiding any inconvenience in the passage between the two movement systems.

This makes it possible to feed articles with precision even at very high speeds, greater than 500 articles per minute for example about 1500 articles per minute, and in a continuous flow.

It goes without saying that a person skilled in the art may, in order to meet specific and contingent application requirements, make further modifications and variants of the above-described invention within the scope of protection as defined by the following claims.

The invention claimed is:

1. A feed unit for articles, comprising:
   a first feeding device,
   a second feeding device configured to individually pick up said articles from said first feeding device, wherein said articles are picked up at a removal location at a predetermined time interval,
   a synchronization device configured to receive said articles from said first feeding device and to move said articles into said removal location at an adjustable speed, and a speed control system configured to adjust the adjustable speed of said synchronization device so that each article reaches said removal location at said time interval in order to be picked up by said second feeding device,
   wherein said speed control system comprises:
   a position sensor for detecting a position of an article during movement of the article on said synchronization device upstream of said removal location, to adjust the adjustable speed of said synchronization device.

2. The feed unit according to claim 1, wherein in said first feeding device said articles are moved in rows one after the other.

3. The feed unit according to claim 2, wherein said first feeding device comprises a guide inside which said articles are moved towards said synchronization device by sliding.

4. The feed unit according to claim 3, wherein said articles slide in said guide by gravitational force or are driven by jets of air.

5. The feed unit according to claim 1, wherein said second feeding device comprises at least one screw configured to pick up one article at a time from said removal location and to move the article at a predefined and controlled speed towards a release location.

6. The feed unit according to claim 5, wherein the at least one screw comprises a pair of counter-rotating screws.

7. The feed unit according to claim 1, wherein said second feeding device is synchronized with an exchange wheel configured to receive said articles delivered by said second feeding device at a release location and to deposit said articles on a conveyor.

8. The feed unit according to claim 1, wherein
   said synchronization device comprises two counter-rotating conveyor belts facing each other, and
   said articles are retained individually between said two counter-rotating conveyor belts when said articles are moved towards said removal location.

9. The feed unit according to claim 8, wherein said control system is further configured to adjust a rotation speed of said two counter-rotating conveyor belts.

10. A method for feeding articles in a controlled manner, comprising:
   moving said articles along a first feeding device,
   receiving said articles from said first feeding device by a synchronization device retaining said articles in an integral manner,
   moving said articles by said synchronization device towards a removal location,
   detecting a position of an article during movement of the article on said synchronization device upstream of said removal location, adjusting speed of said synchronization device based on the detected position of the article, in such a manner that each article reaches said removal location at said time interval in order to be picked up by said second feeding device, and individually picking up said articles by a second feeding device at said removal location at a predetermined time interval.

11. The method according to claim 10, wherein said articles are capsules for infusion type beverages.

12. The method according to claim 10, wherein said articles are protection discs to be inserted in capsules for infusion type beverages.

13. An apparatus for producing capsules for infusion type beverages, comprising:

a conveyor for empty capsules, and the feed unit according to claim 1 for protection discs to be deposited in said empty capsules.

14. An apparatus for packaging capsules for infusion type beverages, comprising:

a conveyor for empty box-shaped packagings, and the feed unit according to claim 1 for capsules for infusion type beverages to be deposited in said empty box-shaped packagings.

* * * * *